UNITED STATES PATENT OFFICE.

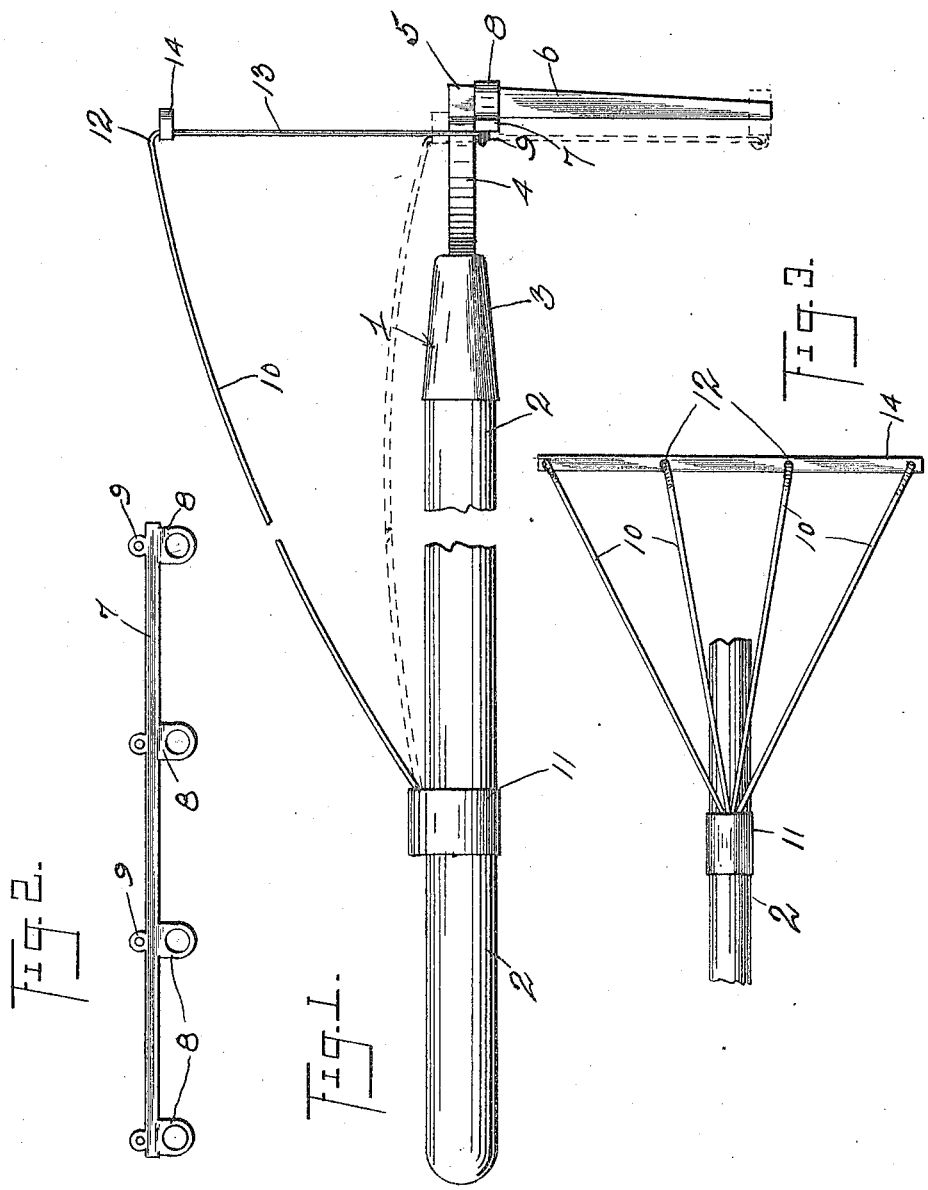

JOHN H. BLOOD, OF NORTH ADAMS, MASSACHUSETTS.

RAKE-CLEANER.

1,180,228.

Specification of Letters Patent.

Patented Apr. 18, 1916.

Application filed April 18, 1914. Serial No. 832,939.

*To all whom it may concern:*

Be it known that I, JOHN H. BLOOD, a citizen of the United States, residing at North Adams, in the county of Berkshire and State of Massachusetts, have invented certain new and useful Improvements in Rake-Cleaners, of which the following is a specification.

My invention relates to new and useful improvements in rakes and more particularly to an attachment therefor which may be operated in an easy and reliable manner to strip the teeth of the rake of leaves, grass and other foreign matter.

An important object of my invention is to provide means of the character described which will save time and annoyance in removing grass, leaves, straw and other litter from rake teeth, making it unnecessary for the operator to touch the litter attached to the teeth.

Another important object of my invention is to provide means for stripping the teeth that will automatically move into inoperative position.

A still further object of my invention is to provide a rake cleaner of the character described that is simple as to construction, capable of being readily attached to rakes of different character, reliable and efficient in operation and cheap to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts, Figure 1 is a side elevation of a rake showing my improved cleaning attachment thereon and in inoperative position. Fig. 2 is a detail plan view of the stripping bar. Fig. 3 is a fragmentary plan view, showing a portion of the rake handle with the spring wires and connecting bar attached thereto, the rake head teeth and stripping bar being not shown.

Referring to the drawings by characters of reference the numeral 1 designates a rake comprising a handle 2 mounted at one end within a socket 3 that is secured by arms 4 to the rake head 5. Carried on the rake head 5 are rake teeth 6 of the usual construction.

My improved rake cleaner comprises a stripping bar 7, which consists of an elongated metal bar provided upon one side with a plurality of spaced right angularly extending lugs 8 that are provided with openings and formed in the nature of rings to receive the rake teeth and guide the bar 7 which is to slide in engagement with rake teeth upon the inner faces thereof, as shown in Fig. 1. A plurality of eyes 9 preferably formed integral with the bar 7 are disposed opposite to each lug 8.

As a means for forcing the stripping bar downwardly upon the teeth to provide the cleaning action and automatically return the stripping bar to inoperative position I provide a plurality of spring wires 10. Certain ends of the wires 10 are secured by a band to the collar 11 to the intermediate portion of the handle 2 and the other ends suitably secured within the eyes 9 on the stripping bar. The wires 10 diverge with relation to each other from the band 11 and are disposed in a forwardly and upwardly inclined plane so as to extend above the rake handle when the rake is in operative position. The wires are then bent downwardly from their outermost extended portions 12 at right angles to the upwardly and forwardly inclined portions to provide downwardly extending arms 13, the lower ends of which are connected as previously described with the eyes 9. A bar 14 provided with a plurality of spaced openings is rigidly connected with the upper extremities of the arms 13 and serves to provide a comparatively rigid structure and as a stop to limit the downward movement of the stripping bar relative to the rake teeth.

When it is desired to strip the teeth 6 the rake is inverted and pressure placed upon the handle 2 by the operator. The wires 10 are placed into engagement with the ground and by pressing upon the handle as described the stripping bar 7 is forced downwardly upon the teeth against the spring action of the wires 10. The wires 10 will automatically return the stripping bar to normal position. The bar 14 provides a bearing surface for the wires when the rake is inverted to bring about the cleaning action described.

With reference to the foregoing description and accompanying drawings it will be clearly seen that I have devised a simple, inexpensive and effective attachment for rakes that will operate in a reliable and expeditious manner to strip rake teeth of leaves, trash and other foreign matter.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

Having thus described the invention what is claimed as new, is:—

A rake cleaner comprising a lower horizontal bar positioned below the rake head and in rear of the rake teeth, a plurality of apertured lugs formed on and extending forwardly from the front side of the bar, said lugs slidably receiving the teeth and forming cleaning elements, apertured lugs extending rearwardly from the rear side of the bar and alined transversely of the bar with its front lugs, vertical arms located in rear of the rake head and attached at their lower ends in the apertures of the rear lugs, an upper horizontal bar secured to the arms near their upper ends to hold the arms in relatively spaced relation, said upper bar extending forwardly beyond the arms to provide a stop adapted to engage the rake head to prevent the front lugs from being moved off the ends of the teeth during the cleaning operation, spring elements extending rearwardly and downwardly from the upper ends of the arms, and means attaching the free ends of the spring elements to the rake handle.

In testimony whereof I affix my signature in presence of two witnesses.

JOHN H. BLOOD.

Witnesses:
P. J. ASHE,
H. REINHARD.

Copies of this patent may be obtained for five cents each, by addressing the "Commissioner of Patents, Washington, D. C."